Patented July 25, 1933

1,919,570

UNITED STATES PATENT OFFICE

JOSEPH ALLEN PICKARD, OF LONDON, ENGLAND, ASSIGNOR TO METAFILTERS (1929) LIMITED, OF MIDDLESEX, ENGLAND, A BRITISH COMPANY

FILTRATION

Application filed February 9, 1931, Serial No. 514,571, and in Great Britain February 10, 1930.

This invention relates to filtration and has for its chief object to provide a new or improved method of and means for filtration of liquids containing impurities or suspended matter with or without filter aid material also in suspension.

In accordance with the present invention a filter comprises a support, a hollow shaft mounted thereon for rotation about a horizontal axis, a filter chamber secured to and communicating with said shaft, a plurality of inwardly draining filter units of the multiple-plate assembly type grouped on horizontal axes within said chamber, means within said chamber supporting said units at their ends, means for bodily rotating the chamber together with said units, means for conducting the fluid to be filtered through said shaft into the chamber and about said units, and means for conducting the filtered fluid away from the interior of said units and out of said chamber during rotation.

Figure 1:
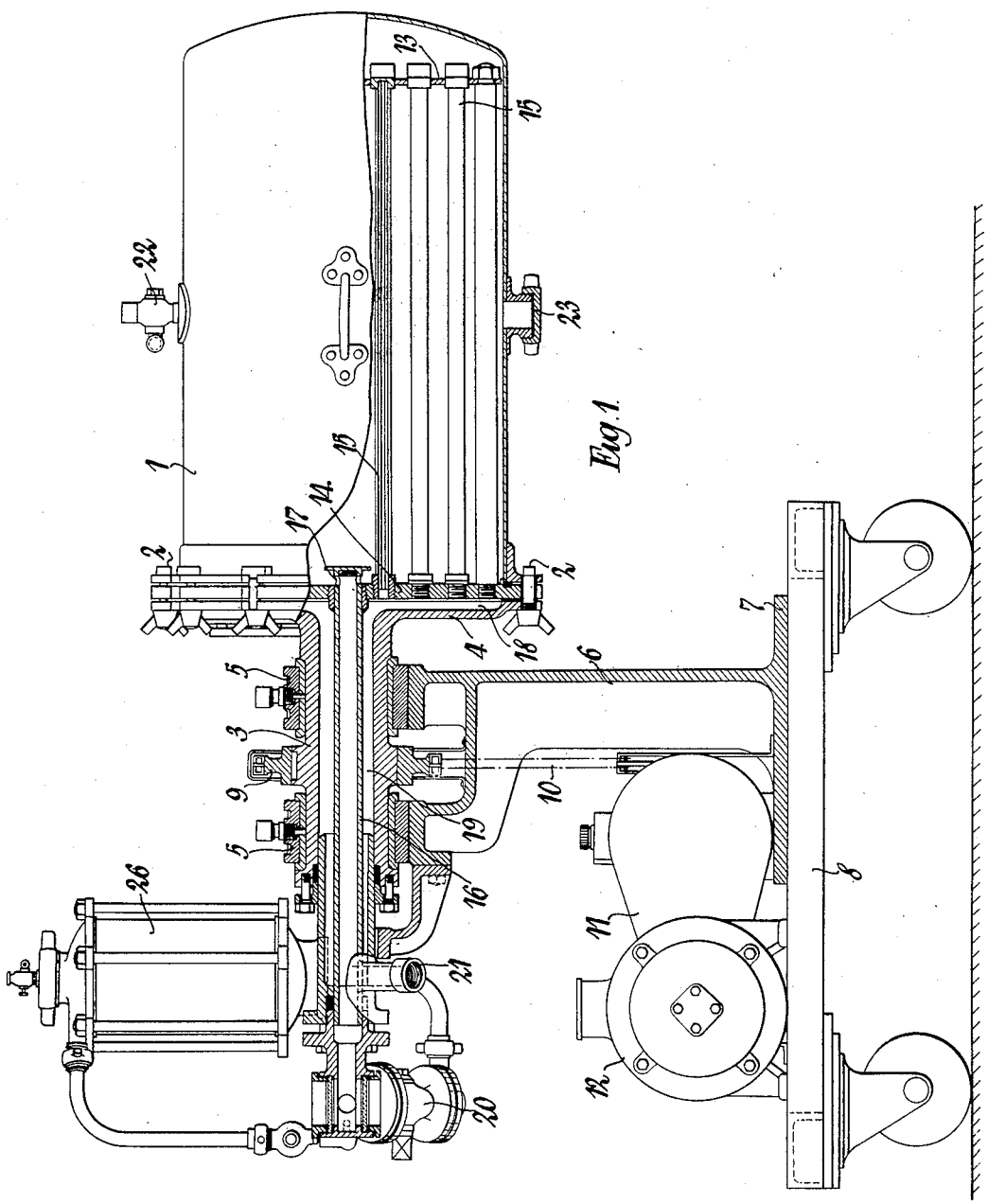
Figure 2:
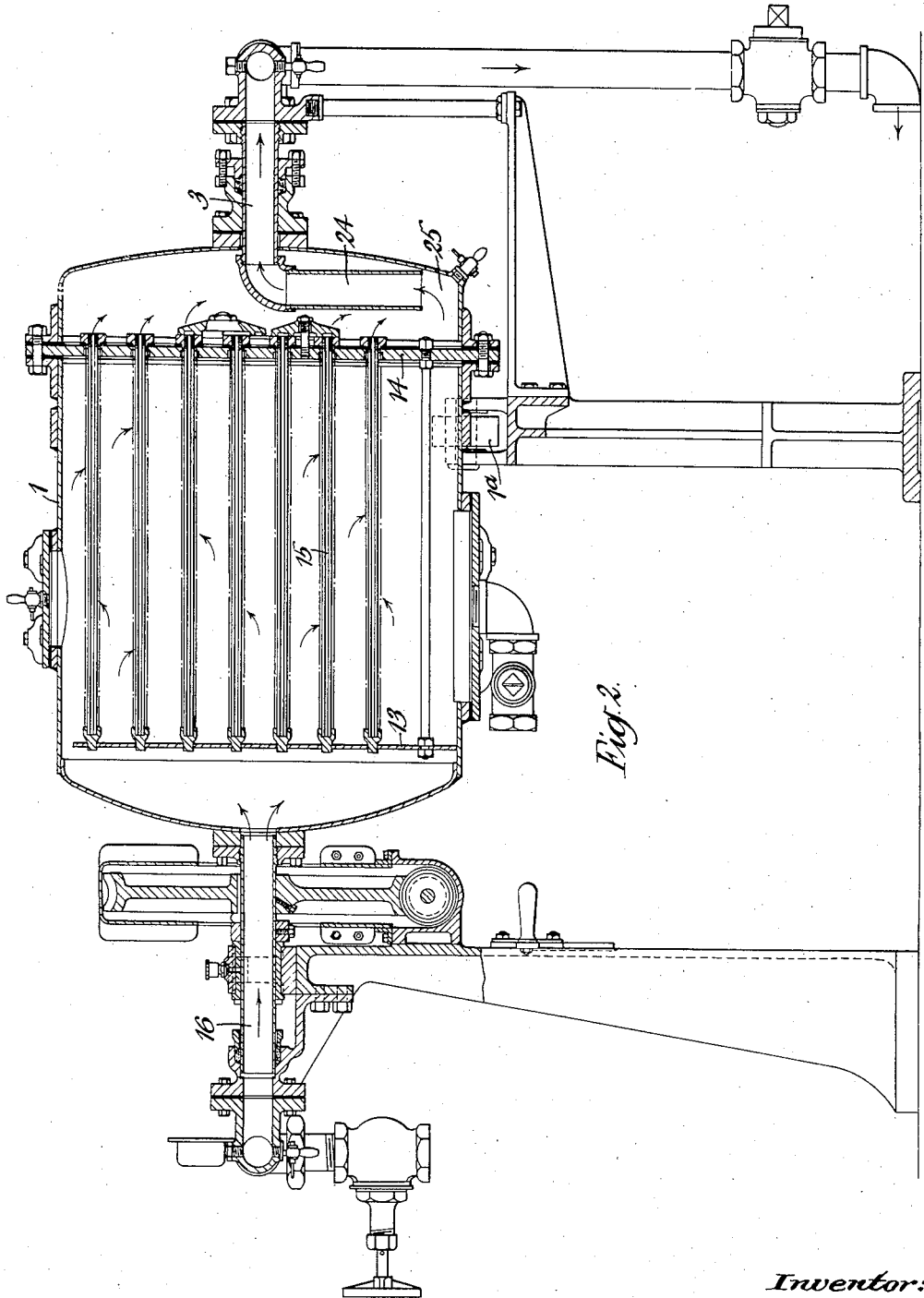

In order that the invention may be clearly understood and readily carried into effect the same will now be described more fully with reference to the accompanying drawings in which Figure 1 is a longitudinal sectional elevation of a filter of the multiple plate type adapted to operate in accordance with the invention, and Figure 2 is a similar elevation of a modified construction.

Referring first to Figure 1, it is seen that the filter chamber 1 is of cylindrical form and is bolted at 2 to one end of a horizontal hollow shaft 3, the latter having a deep flange 4 which serves as an end wall or cover plate to the chamber 1.

The shaft 3 is mounted in suitable bearings 5 on a supporting bracket or pillar 6 upstanding from a base 7 mounted on a travelling platform 8 so that the filter can be transported easily from place to place. On the shaft 3 is secured a toothed wheel 9 connected by a chain 10 with a gear box 11 and motor 12.

Within the chamber 1 are two transverse plates 13 and 14 in which are mounted the ends of a group of filtering units 15 each of which may consist of a perforated tube on which is arranged a pile of filter discs spaced a predetermined distance apart in any known manner, as for example by means of spacing studs or protuberances on the discs or on alternate discs. Each tube is closed at the end secured to the end plate 13 but is open at the end secured in the plate 14. In place of perforated tubes, other means as for example fluted rods may be used to support the discs while permitting of internal drainage.

Mounted axially within the hollow shaft 3 is a hollow inner shaft 16 which is secured at its front end in the end plate 14 and projects slightly as at 17 where it is apertured.

The end plate 14 and the flange 4 on the shaft 3 are spaced apart to provide a narrow annular chamber 18 in communication with the annular space 19 between the inner and outer shafts 16 and 3 respectively.

20 is an inlet pipe in communication with the interior of the inner shaft 16, and 21 is an outlet pipe in communication with the annular space 19.

From the foregoing description the manner in which the filter operates will be readily understood. The material to be filtered enters through the pipe 20, passes along the interior of the shaft 16 and emerges through the end 17 into the chamber beyond the end plate 14. Thence the liquid passes between the plates of the filtering units 15 leaving the impurities or arrested particles on or in the filtering units and thence draining in a clear condition through the tubes of the units 15 into the chamber 18 and along the annular space 19 to the outlet 21. During any part of the filtering operation or throughout the whole filtering period the chamber 1 with its contents and the shafts 3 and 16 are rotated at any desired speed.

The apparatus above described is naturally susceptible of various structural modifications and may have various accessories, as for example an air vent cock 22 and a sludge outlet 23 on the chamber 1. In particular it is to be observed that the filter proper comprising the chamber 1 with end plates 13 and 14 and filtering units 15 can be detached easily from the flange 4; also the filtering units 15 and end plates can then be withdrawn easily from the chamber 1; in large filters the internal face of the chamber 1 may be formed or provided with guides or runways to facilitate such withdrawal. It is also to be observed that the chamber or casing 1 alone may be removed easily when desired and that the filtering units 15 can be removed individually from the end plate 14.

In the modified form of filter represented in Figure 2 the chamber 1 is supported and rotated by the hollow inlet shaft 16 at one end and is supported peripherally at the other end on rollers 1a. The hollow outlet shaft 3 is at the opposite end of the filter and is provided with an extension 24 reaching down towards the lowest part of a collecting or drawing-off space 25 between the end plate 14 and the adjacent end wall of the chamber 1.

Reverting to Figure 1 it may be mentioned that the vessel 26 is included in a shunt circuit on the main stream for introducing any additional substance into the main stream if and when desired; this however forms no part of the present invention.

Although two of the preferred embodiments of the present invention have been described it will be apparent that various modifications or additions may be made. For example the filter chamber may be mounted on rollers and the rotational force be applied to its cylindrical body direct or by way of driving rollers.

The temperature within the filter may be internally or externally controlled, as for example by a heating or cooling medium circulated through coils or through a jacket or by an externally applied flame or by enclosing the whole or a part of the filter within a heating chamber.

The passage of the fluid to be filtered may be effected by pressure or suction and if desired filter aid may be first deposited on the filtering units from suspension, and in fact the rotational property of the filter is of great advantage and importance in this respect as it ensures a uniform distribution of the filter aid on filtering units of the plate assembly type and the possibility of using various filtering materials especially materials not otherwise suitable as filter aids and of establishing various filtering effects or conditions. Also in order to carry up and distribute over the filtering units any filter aid material supplied to the filter it may be provided internally with vanes or baffles to ensure such distribution.

What I claim is:—

1. A filter comprising a support, a hollow shaft mounted thereon for rotation about a horizontal axis, a filter chamber secured to and communicating with said shaft, a plurality of inwardly draining filter units of the multiple-plate assembly type grouped on horizontal axes within said chamber, means within said chamber supporting said units at their ends, means for bodily rotating the chamber together with said units, means for conducting the fluid to be filtered through said shaft into the chamber and about said units, and means for conducting the filtered fluid away from the interior of said units and out of said chamber during rotation, said means connecting with a conduit within the chamber said conduit being freely suspended therein with its lower open end at substantially the lowest point in the said chamber.

2. A filter comprising supports, hollow shafts mounted therein for rotation about a horizontal axis, a filter chamber secured to and communicating with one of said shafts, a plurality of inwardly draining filter units of the multiple-plate assembly type grouped on horizontal axes within said chamber each unit having one end closed and one end open and being mounted between transverse end plates through one of which the said open ends of the units project into a second chamber formed by the said end plate and part of the shell of the first mentioned chamber, means for bodily rotating the chamber together with said units, means for conducting the fluid to be filtered through said shaft into the first mentioned chamber and about said units, and means for conducting the filtered fluid away from the interior of said units into said second mentioned chamber and therefrom to an outlet during rotation, said means connecting with a conduit within the chamber said conduit being freely suspended therein with its lower open end at substantially the lowest point in the said second-mentioned chamber.

JOSEPH ALLEN PICKARD.